(12) United States Patent
Hamad et al.

(10) Patent No.: US 10,697,412 B2
(45) Date of Patent: Jun. 30, 2020

(54) ONBOARD FUEL SEPARATION FOR OCTANE-ON-DEMAND USING MEMBRANE DISTILLATION

(71) Applicant: Saudi Arabian Oil Company, Dhahran (SA)

(72) Inventors: Esam Z. Hamad, Dhahran (SA); Husain A. Baaqel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 90 days.

(21) Appl. No.: 15/896,690

(22) Filed: Feb. 14, 2018

(65) Prior Publication Data

US 2019/0249630 A1 Aug. 15, 2019

(51) Int. Cl.
*F02M 37/30* (2019.01)
*B01D 61/36* (2006.01)
(Continued)

(52) U.S. Cl.
CPC .......... *F02M 37/30* (2019.01); *B01D 61/364* (2013.01); *B01D 61/366* (2013.01); *C10G 31/09* (2013.01);
(Continued)

(58) Field of Classification Search
CPC ...... F02M 37/22; F02M 37/223; F02M 37/30; B01D 61/368; B01D 61/366; B01D 61/362; B01D 61/36; B01D 61/364; B01D 2325/36; B60K 15/03; B60K 2015/03355; B60K 2015/03157; B60K 2015/03118; B60K 2015/03131; B60K 2015/03144;
(Continued)

(56) References Cited

U.S. PATENT DOCUMENTS 2,930,754 A 3/1960 Stuckey
4,802,987 A * 2/1989 Black .................. B01D 61/362
210/640

(Continued)

FOREIGN PATENT DOCUMENTS

EP 0366844 A1 5/1990
WO 2009/006307 * 1/2009

OTHER PUBLICATIONS

International Search Report and Written Opinion in corresponding PCT Application No. PCT/US2019/013130, dated Apr. 18, 2019.

*Primary Examiner* — Joseph W Drodge
(74) *Attorney, Agent, or Firm* — Leason Ellis LLP (57) ABSTRACT

The present application is directed to systems and methods for on-board fuel separation. The system includes: a source fuel tank for liquid fuel; a pump; and a membrane module. The membrane module includes a hydrophilic membrane, a retentate channel, and a permeate channel. The retentate and permeate channels are on opposing sides of the membrane. The membrane module receives fuel from the source fuel tank and separates the liquid fuel into a high octane fraction that collects in the retentate channel and a low octane fraction that diffuses through the membrane to the permeate channel. The system further includes a low octane fuel tank for receiving at least a portion of the low octane fraction, a high octane fuel tank for receiving at least a portion of the high octane fraction, and an engine configured to selectively receive at least a portion of the low and high octane fractions.

18 Claims, 6 Drawing Sheets

(51) Int. Cl.
  *C10G 31/09* (2006.01)
  *F02D 19/06* (2006.01)
  *F02D 41/00* (2006.01)

(52) U.S. Cl.
  CPC ..... *F02D 19/0649* (2013.01); *F02D 19/0671* (2013.01); *B01D 2311/12* (2013.01); *B01D 2311/13* (2013.01); *B01D 2325/36* (2013.01); *F02D 41/0025* (2013.01)

(58) Field of Classification Search
  CPC .......... B60K 2015/03151; C10G 31/09; F02D 19/0649; F02D 19/0671; F02D 41/0025
  USPC ..... 210/640, 650, 651, 739, 774, 85, 86, 97, 210/172.1, 175, 184, 321.6; 123/1 A, 3, 123/304, 575–578
  See application file for complete search history.

(56) References Cited

U.S. PATENT DOCUMENTS

| | | | |
|---|---|---|---|
| 5,045,206 A | 9/1991 | Chen et al. | |
| 6,972,093 B2 | 12/2005 | Partridge et al. | |
| 7,093,663 B1 * | 8/2006 | Bader | B01D 61/147 166/279 |
| 7,803,275 B2 | 9/2010 | Partridge et al. | |
| 8,118,009 B2 | 2/2012 | Pursifull et al. | |
| 8,141,356 B2 | 3/2012 | Leone et al. | |
| 8,211,300 B2 | 7/2012 | Partridge et al. | |
| 8,258,363 B2 | 9/2012 | Kalakkunnath et al. | |
| 8,375,899 B2 | 2/2013 | Leone et al. | |
| 8,580,111 B2 * | 11/2013 | Partridge | B01D 61/36 123/3 |
| 8,656,869 B2 | 2/2014 | Leone et al. | |
| 2002/0139111 A1 * | 10/2002 | Ueda | B01D 61/36 60/285 |
| 2005/0103285 A1 * | 5/2005 | Oda | F02B 51/00 123/3 |
| 2006/0037589 A1 | 6/2006 | Gupta et al. | |
| 2008/0128350 A1 * | 6/2008 | Arakawa | B01D 61/02 210/500.21 |
| 2009/0247805 A1 * | 10/2009 | Bournay | B01D 61/02 585/738 |
| 2010/0121559 A1 | 5/2010 | Bromberg et al. | |
| 2010/0155315 A1 * | 6/2010 | Partridge | B01D 19/0031 210/149 |
| 2012/0030996 A1 * | 2/2012 | Horton | B01J 21/16 44/452 |
| 2012/0030997 A1 * | 2/2012 | Johnston | B01J 21/16 44/452 |
| 2013/0071793 A1 * | 3/2013 | Ma | B01D 61/364 431/2 |
| 2013/0168311 A1 | 7/2013 | Johnson et al. | |
| 2013/0333644 A1 * | 12/2013 | Shigetoyo | F02D 19/0649 123/41.08 |
| 2014/0007842 A1 * | 1/2014 | Kudo | F02D 19/0671 123/445 |
| 2014/0041642 A1 * | 2/2014 | Tsutsumi | F02D 19/0671 123/541 |
| 2014/0124419 A1 * | 5/2014 | Chishima | F02D 19/0634 210/90 |
| 2015/0052877 A1 * | 2/2015 | Leone | F02D 19/0649 60/273 |
| 2015/0225320 A1 * | 8/2015 | Shaik | C07C 29/04 44/452 |
| 2017/0145969 A1 * | 5/2017 | Ishimitsu | B01D 61/362 |
| 2017/0368504 A1 | 12/2017 | Hamad et al. | |

* cited by examiner

ONBOARD FUEL SEPARATION FOR OCTANE-ON-DEMAND USING MEMBRANE DISTILLATION

TECHNICAL FIELD

The present disclosure is directed to systems and methods for separating fuels based on relative volatility and diffusivity. In particular, the present disclosure is directed to on-board systems and methods for separating fuel in vehicles for subsequent use in an internal combustion engine.

BACKGROUND OF THE INVENTION

While newer, greener energy sources and methods for utilizing such sources continue to be explored, crude oil is still one of the primary sources of the world's energy. As such, gasoline, a derivative of crude oil, remains a primary fuel for internal combustion engines.

In order to increase fuel efficiency and reduce carbon emissions from gasoline, new systems, such as octane-on-demand systems, are being developed in which the engine can make use of lower quality fuels. While these systems have shown promise, they still remain inefficient in their utilization of gasoline and require extensive and costly modification to existing vehicles in order to implement the system.

Accordingly, there is a need for a solution that increases fuel efficiency for internal combustion engines, reduces carbon emissions, and yet remains cost-effective.

SUMMARY OF THE INVENTION

The present application describes system and methods for on-board fuel separation. According to a first aspect, a system for on-board fuel separation using membrane distillation is provided in which the system is mounted in a vehicle. The system includes a source fuel tank that comprises liquid fuel, and a pump configured to deliver the liquid fuel from the source fuel tank. In at least one aspect, the liquid fuel can be gasoline, naphtha, or diesel fuel.

The system also includes a membrane module that comprises a hydrophilic membrane, a retentate channel, and a permeate channel. The retentate and permeate channels are disposed on opposing sides of the hydrophilic membrane, and the retentate channel and permeate channel are configured to receive the liquid fuel from the source fuel tank via respective feed channels. The membrane module is also configured to separate the liquid fuel into a high octane fraction that remains in the retentate channel and a low octane fraction that diffuses through the hydrophilic membrane to the permeate channel. The hydrophilic membrane can be in the form of a flat sheet, a hollow fiber, or a spiral wound.

The system further includes a low octane fuel tank configured to receive the low octane fraction from the permeate channel and a high octane fuel tank configured to receive the high octane fraction from the retentate channel. The system also includes an engine fluidly connected to the permeate channel and retentate channel and configured to selectively receive at least a portion of the low octane fraction and at least a portion of the high octane fraction.

According to another aspect, the system can further include a preheater configured to preheat the liquid fuel prior to delivery of the liquid fuel to the retentate and permeate channels of the membrane module.

According to another aspect, the system can include a heat exchanger fluidly connected to the retentate channel and configured to maintain the temperature of the retentate channel to enhance separation of the high octane fraction from the low octane fraction in the membrane module.

According to another aspect, only the retentate channel is configured to receive the liquid fuel from the source fuel tank via a feed channel. In accordance with this aspect, the system further includes a gas channel fluidly connected to the permeate channel and configured to deliver a sweeping gas to the permeate channel. In at least one aspect, the system can include a flash tank fluidly connected to the permeate channel and configured to selectively receive at least a portion of the low octane fraction and the sweeping gas, and to separate the low octane fraction from the sweeping gas.

According to another aspect, the membrane module is further configured to receive a solvent for enhancing the separation of the low octane and high octane fractions, and a flash tank is further configured to separate the high octane fraction from the solvent.

According to another aspect, a method for on-board fuel separation in a vehicle using membrane distillation is provided. In the method, the liquid fuel is pumped from the source fuel tank to the membrane module. The liquid fuel is then separated via the membrane module into a high octane fraction and a low octane fraction, where the high octane fraction collects in the retentate channel and the low octane fraction diffuses through the hydrophilic membrane to the permeate channel. At least a portion of the hot octane fraction is selectively delivered from the retentate channel to the high octane fuel tank or to the engine of the vehicle. Similarly, at least a portion of the low octane fraction is selectively delivered to the low octane fuel tank or to the engine of the vehicle.

According to another aspect of the method, the liquid fuel is preheated prior to its delivery to the membrane module.

According to another aspect of the method, the retentate channel is heated via a heat exchanger to enhance separation of the hot octane fraction from the low octane fraction. The heat exchanger can produce heat using a hot coolant or an exhaust gas.

According to another aspect of the method, a sweeping gas stream is passed through the permeate channel to produce a mixture of sweeping gas and the low octane fraction, the low octane fraction is condensed in a condenser prior to delivery of the low octane fraction to the engine or the low octane fuel tank, and the low octane fraction is separated from the sweeping gas via a flash tank prior to delivery of the low octane fraction to the low octane fuel tank.

According to another aspect of the method, a solvent is supplied to the retentate channel of the membrane module, such that the solvent enhances the separation of the low octane and high octane fractions, and the high octane fraction is then separated from the solvent via flash distillation in a flash tank.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

The present application describes on-board systems and methods for separating fuel. In particular, the application describes systems and methods for on-board fuel separation using membrane distillation. The present application targets challenges associated with, among other things, gasoline fuel efficiency for internal combustion engines and carbon emissions, and provides solutions to such technical challenges.

In one or more embodiments, the on-board system comprises a source fuel tank for housing liquid fuel (e.g., gasoline) and a pump for delivering the liquid fuel from the source fuel tank to a membrane module. The membrane module can include a membrane, a retentate channel, and a permeate channel. The membrane module is configured to separate the liquid fuel into a high octane fraction and a low octane fraction, where the high octane fraction collects in the retentate channel and the low octane fraction diffuses through the membrane to the permeate channel. The high octane and low octane fractions are then be passed to respective fuel storage tanks or to the engine for use as fuel.

The present methods use membrane distillation (e.g., sweeping gas membrane distillation, direct contact membrane distillation) for separating the source fuel into two separate fuel components. The membrane can act as a vapor-liquid interface and a liquid barrier. The separation of the fuel can be based on relative volatility and diffusivity through the membrane pores and the driving force of separation is generally chemical potential, which relates to vapor pressure difference and temperature difference. In certain embodiments, a partially or fully miscible solvent can be added to the liquid fuel to alter the vapor pressures and thereby enhance the separation process. The present method uses less energy than conventional distillation process.

The present systems and methods can separate fuel components based on their relative volatility, molecular diffusion in air, and/or Knudsen diffusion in pores. This allows the system to separate a source fuel into two fuels of varying octane numbers (i.e., a low octane fuel and a high octane fuel) to improve engine efficiency and fuel economy. Similarly, the present systems and methods can also be used to separate certain fuels (e.g., diesel fuels) into low cetane and high cetane fuel components, or high and low volatility components. Another advantage is that the membrane used in the present systems and methods does not need to be designed with selective permeability since it acts as a liquid-phase interface rather than a selective barrier. The separation of the fuel can be achieved by creating a partial vapor pressure difference between the two channels of the membrane module and by creating a temperature difference. In both cases, a chemical potential difference is created to drive the low octane components to the permeate channel.

The referenced on-board systems and methods for separating fuel are now described more fully with reference to the accompanying drawings, in which one or more illustrated embodiments and/or arrangements of the systems and methods are shown.

The systems and methods of the present application are not limited in any way to the illustrated embodiments and/or arrangements as the illustrated embodiments and/or arrangements. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

Figure 1:
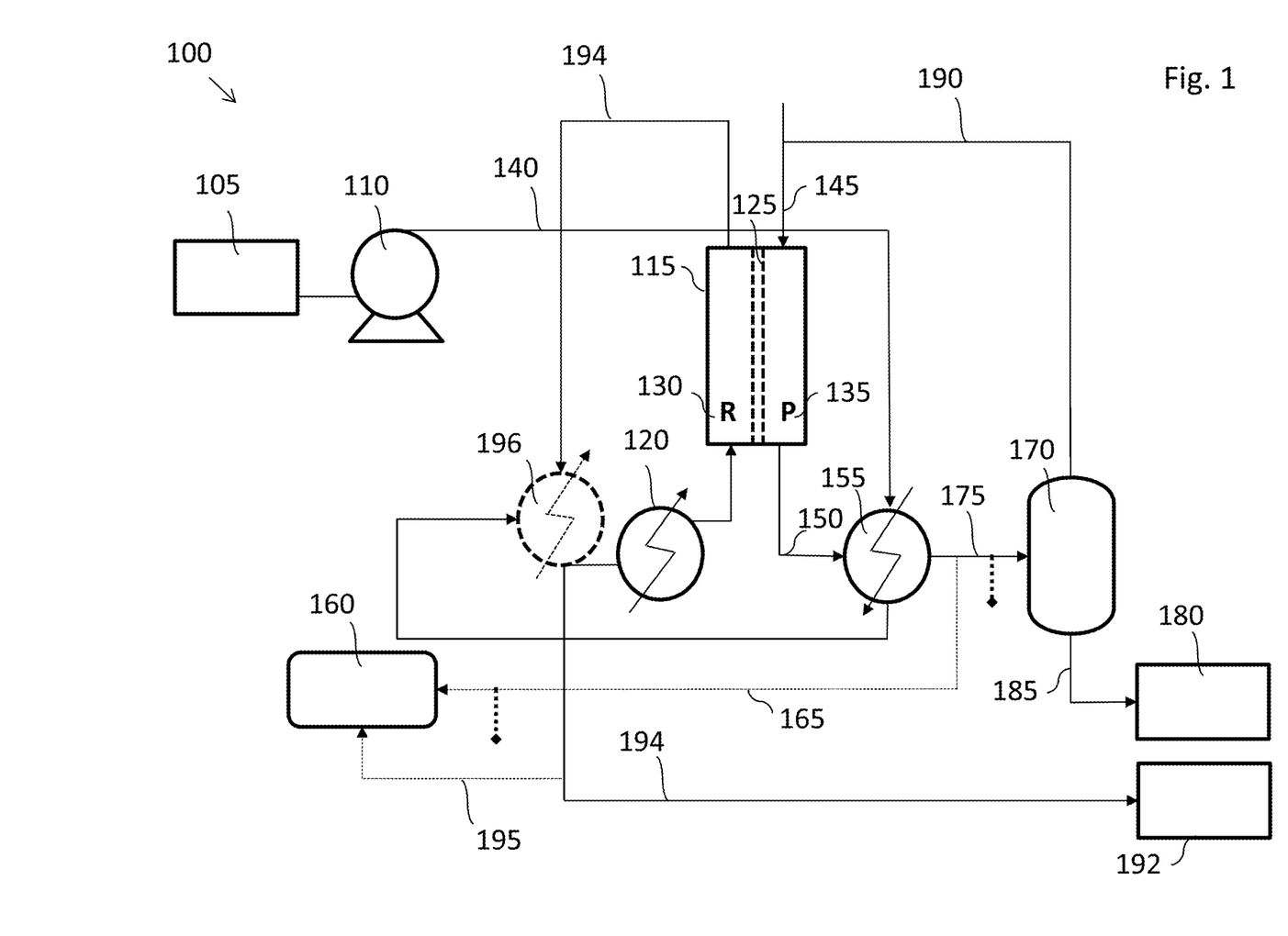
FIG. 1 displays a schematic of an exemplary on-board fuel separation system that utilizes sweeping gas membrane distillation in accordance with one or more embodiments.

FIG. 1 displays a diagram of an exemplary on-board fuel separation system 100 in a sweeping gas membrane distillation configuration in accordance with one or more embodiments. The system 100 is generally mounted within a vehicle (e.g., automobile) and operatively connected to the powertrain system of the vehicle. The operating conditions of the system 100 and the powertrain system of the vehicle are such that they ensure smooth and efficient vehicle operation. The system 100 includes a source fuel tank 105 for storage of the source fuel. In one or more embodiments, the source fuel is a conventional liquid fuel such as gasoline, naphtha, or diesel. System 100 further comprises a pump 110 and membrane module 115, where the pump 110 is configured to send the liquid fuel from the source fuel tank 105 to the membrane module 115. In one or more embodiments, the pump 110 can be part of the existing fuel rail in the vehicle. In at least one embodiment, the liquid fuel can be heated via a preheater 120 before reaching the membrane module 115.

In the membrane module 115, a membrane 125 is used separate the vapor molecules of the liquid fuel from the liquid molecules of the liquid fuel based on relative volatility and diffusivity. The membrane 125 is a hydrophilic membrane that is generally impermeable to liquid. The membrane 125 can be of various forms and shapes, including in the form of a flat sheet, a hollow fiber, or a spiral wound. The membrane 125 of the present systems does not act as a selective barrier in that it does not separate the liquid fuel based on selective molecular size permeability or the solubility of the different components of the liquid fuel. Further, the membrane 125 does not act as a chemically selective barrier. Rather, the membrane 125 acts as a liquid-gas interface such that vapor molecules of the liquid fuel permeate through the membrane 125, while the liquid molecules of the fuel do not. As such, the membrane 125 is "passive" in the sense that it does not actively cause the separation of the liquid fuel. Instead, the membrane 125 acts as a porous, physical barrier between the liquid and vapor phase of the liquid fuel. In one or more embodiments, the liquid fuel in the membrane 125 has a temperature that is below the bubble point temperature of the liquid fuel to avoid boiling of the fuel.

The membrane 125 is generally hydrophilic because the fuel use in the present systems is generally organic and hydrophobic. Thus, in order to prevent membrane wetting (i.e., filling of the membrane pores with liquid), the material of the membrane 125 provides high surface tension so that the liquid portion of the organic fuel cannot enter the membrane pores.

The membrane module 115 further includes a retentate channel 130 and a permeate channel 135. In one or more embodiments, the liquid fuel flows from the source tank 105 through feed conduit 140 and enters the membrane module 115 via the retentate channel 130. Based on relative volatility and diffusivity, the low octane, high relative volatility component or fraction (vapor component) of the liquid fuel diffuse through the membrane 125 to the permeate channel 135, while the high octane, low relative volatility component or fraction (liquid component) of the liquid fuel remains and collects in the retentate channel 130.

In the embodiment shown in FIG. 1, separation of the high and low octane components is enhanced by a sweeping gas stream (e.g., air at ambient temperature) that enters the permeate channel 135 via gas conduit 145. In one or more embodiments, the air from the air intake of the engine can be used as the sweeping gas stream. In other embodiments, an additional air intake unrelated to the engine can be used to provide the sweeping gas for the system. In at least one embodiment, inert gas can be used as the sweeping gas for facilitating separation of the components of the liquid fuel after contact with the membrane. As it passes through the permeate channel 135, the sweeping gas enhances the temperature difference and the vapor pressure difference between the permeate channel 135 and the retentate channel 130, thereby causing increased permeation of the low octane component through the membrane 125 and into the permeate channel 135. The low octane components that diffuse into the permeate channel 135 are then carried by the sweeping gas out of the permeate channel 135 via a conduit 150. For embodiments in which diesel fuel is the source fuel, the membrane module 115 can separate the source diesel fuel into components in a similar fashion as it separates gasoline fuel. For example, high relative volatility components of the diesel fuel diffuse through the membrane 125 to the permeate channel 135, while the low relative volatility components of the diesel fuel remains and collects in the retentate channel 130.

The mixture of the sweeping gas and the low octane component (permeate) are then directed through the conduit 150 to a condenser 155. At the condenser 155, the liquid fuel from source tank 105 can optionally pass through the condenser 155 (prior to entry into the membrane module 115) as the permeate and sweeping gas is also passing through the condenser 155. The liquid fuel and the permeate-sweeping gas mixture enter the condenser via separate inlets and remain separated within the condenser 155 (e.g., in separate conduits) The lower temperature of the liquid fuel causes the permeate (low octane component) to condense into a liquid phase, thereby separating it from the sweeping gas The condensed low octane component can then be selectively directed to the engine 160 of the vehicle via conduit 165 for use as fuel or can be directed to a flash tank 170 via conduit 175. Controlling whether the low octane component is directed to the engine 160 or to a flash tank 170 can be controlled via a valve. In one or more embodiments, the determination as to whether the low octane components are directed to the engine 160 or the flash tank 170 is controlled via a feedback control system. In at least one embodiment, a combination of engine and system data can be used by the system to control the valve position, and thus control whether the low octane components are direct to the engine or to storage by way of the flash tank 170. Additionally, in certain embodiments the system in the vehicle can be programmed to run at a different conditions based on the engine response to the fuel. For example, the engine response to the fuel can be used to automatically select the best operating conditions for the engine. There is a parallel practice now in gasoline engines, where the knock detector is used to adjust engine parameters to the fuel. In the flash tank 170, the low octane component is further separated from the sweeping gas, and the resulting, separated low octane component is then directed to a low octane fuel tank 180 via conduit 185. The separated sweeping gas can then be recycled back to gas conduit 145 via conduit 190 for reintroduction into the permeate channel 135.

The high octane component (retentate) that collects in the retentate channel 130 is then selectively directed to a high octane fuel tank 192 via conduit 194 or can be directed to the engine 160 via conduit 195. The high octane components can comprise aromatic compounds, for example. In at least one embodiment, a heat exchanger 196 can be operatively connected to the retentate channel 130 to keep the temperature in the channel 130 constant, thereby enhancing the separation of the high and low octane components. The source for the heat in the heat exchanger 196 can be, for example, a hot coolant or an exhaust gas. In the embodiment shown in FIG. 1, the heat exchanger 196 can also act as another preheater for the liquid fuel before it reaches the membrane module 115 by utilizing the hot retentate thermal energy. The preheater 120 can then be used to further heat the liquid feed to the desired temperature before it enters the membrane module 115.

In at least one embodiment, a solvent can be added to the liquid fuel to alter the vapor pressure of the liquid fuel and thus enhance the separation of the high and low octane components. The solvent can be housed in a separate tank (not shown) operatively connected to the feed channel 140 such that the solvent can be mixed with the liquid fuel prior to liquid fuel reaching the membrane module 115. The solvent can be a partially or fully miscible solvent. In certain embodiments, solvents such as triethylene glycol (TEG) and heterocyclic solvents can be used with fuels that are high in oxygenates and aromatics to enhance separation of the fuel components, as TEG and heterocyclic solvents tend to interact strongly with oxygenates and aromatics. The solvent's primary function is to extract certain components with certain functional groups from the liquid fuel or to alter the partial vapor pressure of the fuel to enhance separation of the fuel components. Whether components are extracted or whether partial vapor pressure is altered depends upon the solvent used, the amount of solvent used, and the composition of the liquid fuel. Depending on the solvent used, the solvent can extract either high octane or low octane components (or, for diesel fuels, low cetane or high cetane components). In embodiments in which a solvent is used, the solvent collects with the high octane component in the retentate channel 130. Accordingly, the high octane component can be subsequently directed to a flash tank (not shown) to undergo flash distillation to separate the high octane component from the solvent prior to high octane component being delivered to the high octane fuel tank 192 or the engine 160.

Figure 2:
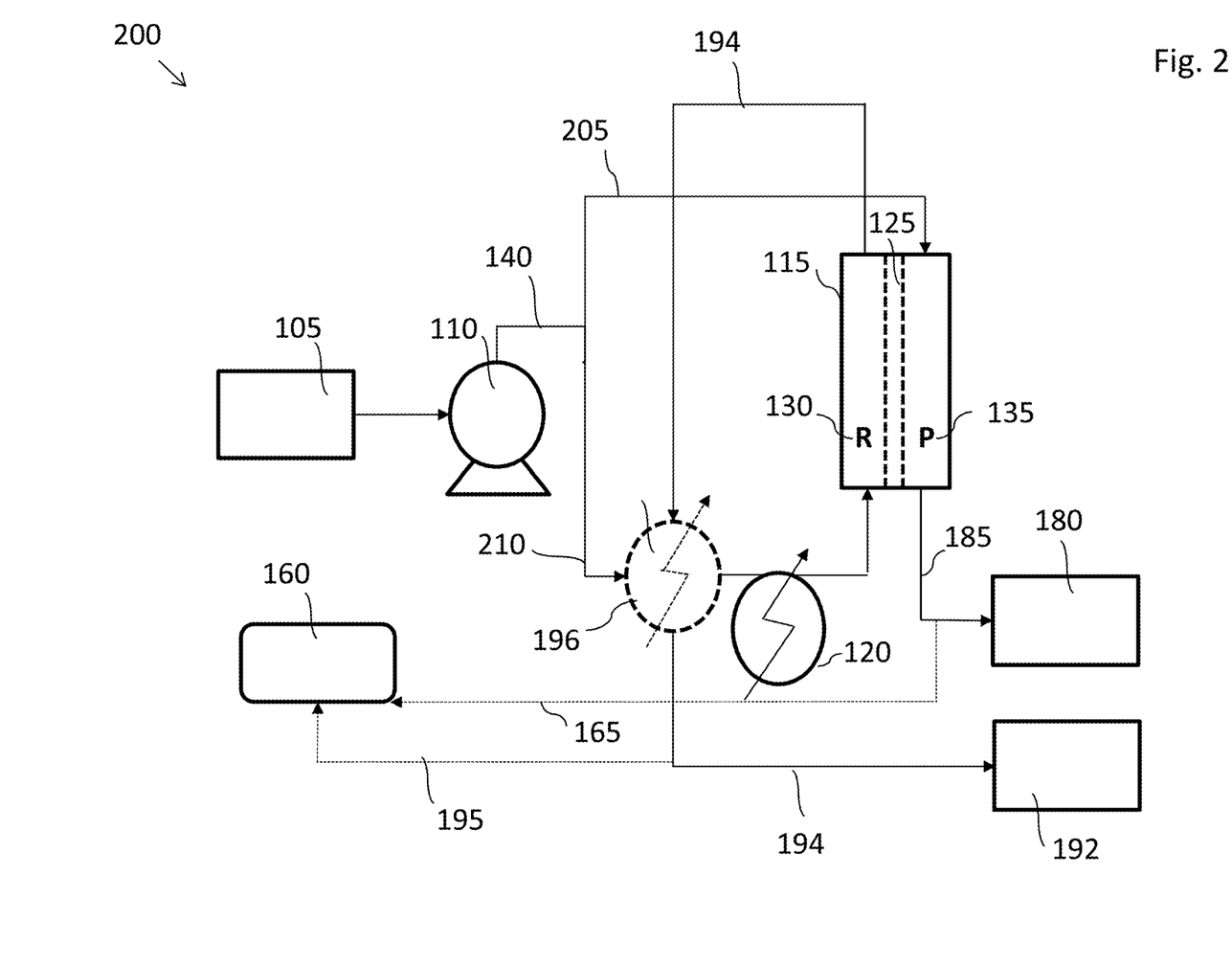
FIG. 2 displays a schematic of an exemplary on-board fuel separation system that utilizes direct contact membrane distillation in accordance with one or more embodiments.

FIG. 2 displays a diagram of an exemplary on-board fuel separation system 200 in accordance with one or more embodiments. The system 200 is similar to the system 100 of exemplified in FIG. 1, except in system 200, separation of the fuel components is accomplished via direct contact membrane distillation rather than a sweeping gas membrane distillation. System 200, as exemplified at FIG. 2, can comprise several of the same components as are included in system 100, such as a source fuel tank 105, a pump 110, a membrane module 115 (including membrane 125, retentate channel 130 and permeate channel 135), a preheater 120, a low octane fuel tank 180, and a high octane fuel tank 192.

In the system 200, liquid fuel from the source tank 105 is pumped (via pum110) to both the permeate channel 130 and the retentate channel 135. In particular, as shown in FIG. 2, the liquid fuel is delivered via pump 110 to the feed channel 140. The feed channel 140 is then split into a permeate feed channel 205 and a retentate feed channel 210, where the permeate feed channel 205 delivers a portion of the liquid fuel to the permeate channel 135, and the retentate feed channel 210 delivers a portion of the liquid fuel to the retentate channel 130. As such, both the permeate channel 135 and the retentate channel 130 begin with the fuel having the same octane.

In one or more embodiments, the portion of the liquid fuel delivered to the retentate channel 130 can be first delivered to a heat exchanger 196 for heating of the fuel prior to its delivery to the retentate channel 130. The retentate channel 130 is thus maintained at a higher temperature than the permeate channel 135 due to preheating of the liquid fuel delivered retentate channel. This temperature difference between the retentate channel 130 and the permeate channel 135 creates a vapor pressure difference between the channels, thereby resulting in low octane components in the retentate channel 130 permeating through the hydrophilic membrane 125 to the permeate channel 135, where the permeating components contact the colder liquid fuel. As such, as the low octane components permeate into the permeate channel 135, octane value for the fuel component in the permeate channel 135 decreases, while the octane value for the fuel component in the retentate channel 130 increases.

After separation of the low and high octane components in the membrane module, the permeate (predominately low octane components) are selectively delivered from the permeate channel 135 to the low octane fuel tank 180 via conduit 185 or delivered to the engine 160 via conduit 165. Similarly, the retentate (predominately high octane components) are delivered from the retentate channel 130 to the high octane fuel tank 192 via conduit 194 or can be selectively directed to the engine 160 via conduit 195. In at least one embodiment, the retentate can pass through the heat exchanger 196, thereby transferring heat to the liquid fuel in the retentate feed channel 210 before it reaches the retentate channel 130. As a result, the retentate is cooled prior to being delivered to the high octane fuel tank 192 or the engine 160.

Like system 100, in at least one embodiment of system 200, a solvent can be added to the liquid fuel to alter the vapor pressure of the liquid fuel and thus enhance the separation of the high and low octane components. In embodiments in which a solvent is used, the solvent collects with the high octane component in the retentate channel 130. Accordingly, in this embodiment, the high octane component can be subsequently directed to a flash tank (not shown) to undergo flash distillation to separate the high octane component from the solvent prior to high octane component being delivered to the high octane fuel tank 192 or the engine 160.

In the embodiments exemplified in system 100 (sweeping gas membrane distillation) and system 200 (direct contact membrane distillation), the primary driving force of the separation of low and high octane components (fractions) via membrane distillation is chemical potential, specifically the chemical potential difference between the retentate and permeate channels. The greater the chemical potential difference between the channels, the greater the driving force is and thus the greater the separation between the components is. Temperature and partial pressure difference contribute to overall chemical potential difference between the retentate and permeate channels. In particular, the temperature difference between the retentate channel and the permeate channel helps to create differences in partial pressure between the channels, which creates and maintains the flux of low octane components that permeates the membrane into the permeate channel. The temperature and partial pressure differences between the retentate and permeate channels further creates a difference between the channels in chemical potential, which is a function of temperature, pressure, and composition. The temperature and partial pressure differences between the retentate and permeate channels, and as a result the separation of the low and high octane components, are further enhanced in embodiments of the present systems that utilize both a sweeping gas in the permeate channel and a heat exchanger operatively connected to the retentate channel. The sweeping gas in the permeate channel and the heat exchanger connected to the retentate channel act in a complementary fashion to create an even greater difference in temperature and partial pressure between the two channels than in embodiments in which only one of a sweeping gas or a heat exchanger are used.

Utilization of the present systems and methods allow octane-on-demand systems to operate more efficiently. In particular, at high load and high engine speed conditions, the present systems can be configured such that the engine consumes the separated high octane components. Conversely, at low load and low engine speed conditions, the present systems can be configured such that the engine consumes the separated low octane components. As such, the present systems and methods improve fuel efficiency for internal combustion engines. Moreover, because the present systems and methods allow high octane components to be separated from normal fuel streams, the usage of complex processes in refineries to produce high octane fuels is reduced, thereby reducing greenhouse gas emissions (e.g., $CO_2$ emissions).

The present systems also provide an advantage over current systems, such as current octane-on-demand systems, in that the present system allows a user to use the same conventional fuel used at gas stations. In other words, the user can fill the source fuel tank 105 with conventional fuel just as a user would fill up the tank of any other vehicle. However, a vehicle that utilizes the present system can operate more efficiently, as the system separates the conventional fuel into high and low octane components, which allows the engine to utilize high octane components during periods of high load, and low octane components during periods of low load.

FIGS. 3A-3B and FIGS. 4A-4B illustrate the performance of exemplary flat plate membrane distillation systems in separating a 91 gasoline surrogate fuel into low octane and high octane fuels in accordance with one or more embodiments of the present application.

Figure 3A:
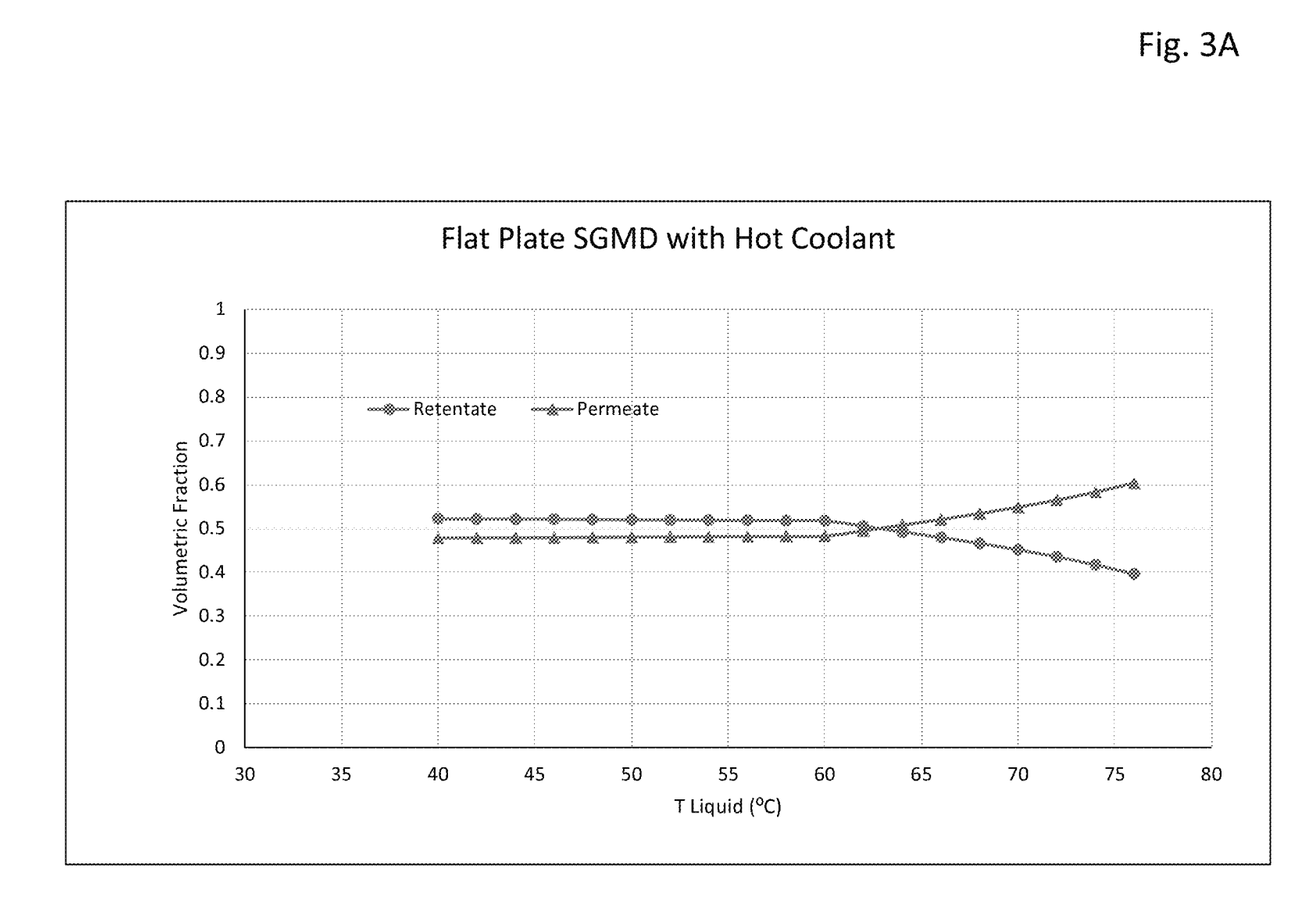
FIG. 3A displays a graph showing how volumetric fraction changes with retentate temperature in the separation system utilizing sweeping gas membrane distillation (SGMD) in accordance with one or more embodiments.
Figure 3B:
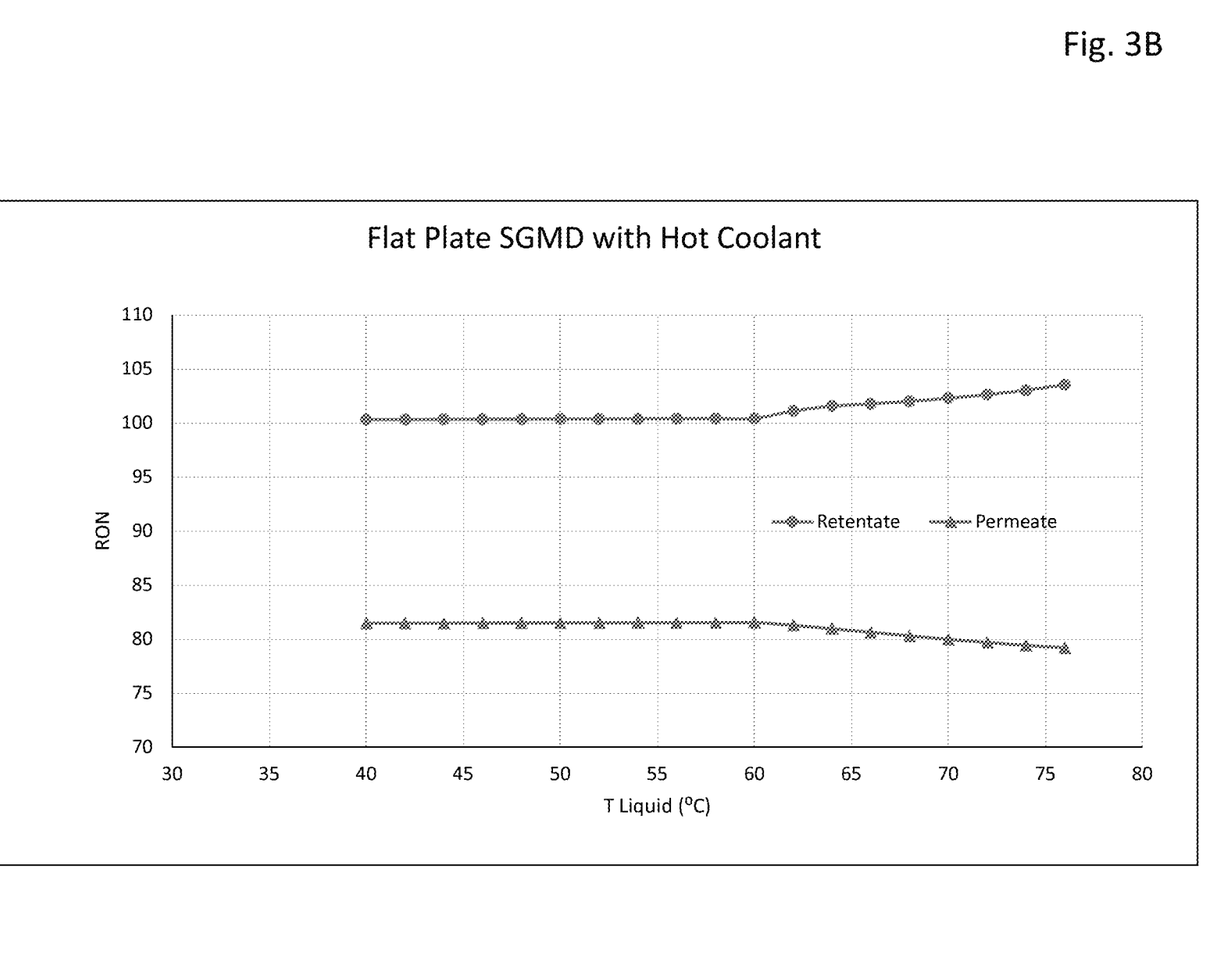
FIG. 3B displays a graph showing how Research Octane Number (RON) changes with retentate temperature in the separation system utilizing sweeping gas membrane distillation (SGMD) in accordance with one or more embodiments.

More specifically, FIGS. 3A-3B shows how volumetric fraction (FIG. 3A) and octane rating (FIG. 3B) change with retentate temperature respectively in a sweeping gas membrane distillation configuration (SGMD) when the permeate channel consists of air at ambient temperature. As shown in FIG. 3A, as the retentate temperature increases, the volumetric fraction of permeate increases since more components are able to change into gas phase and penetrate the membrane. Similarly, as displayed in the graph of FIG. 3B, as the retentate temperature increases, octane rating separation increases since the retentate channel becomes more concentrated in the high octane components.

Figure 4A:
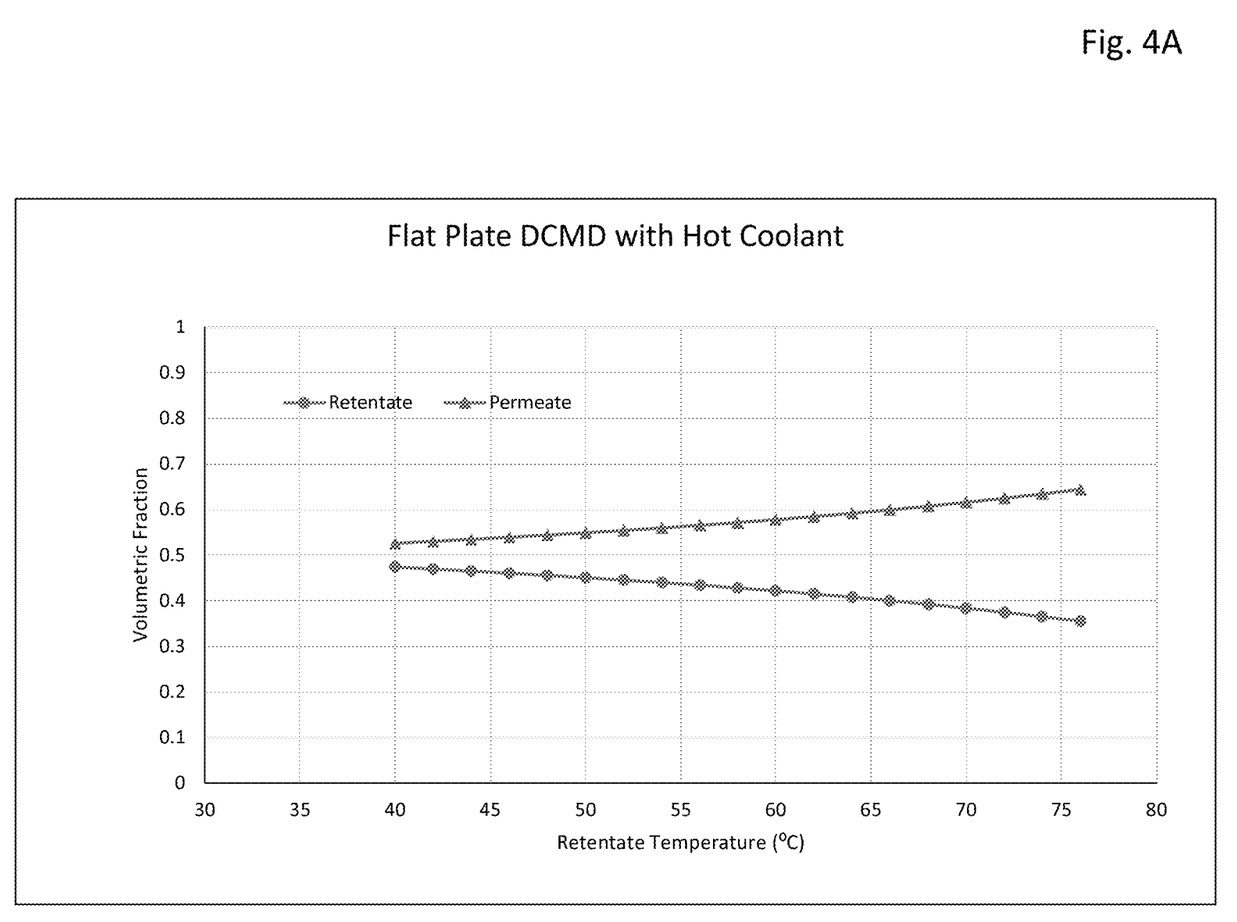
FIG. 4A displays a graph showing how volumetric fraction changes with retentate temperature in the separation system utilizing direct contact membrane distillation (DCMD) in accordance with one or more embodiments.
Figure 4B:
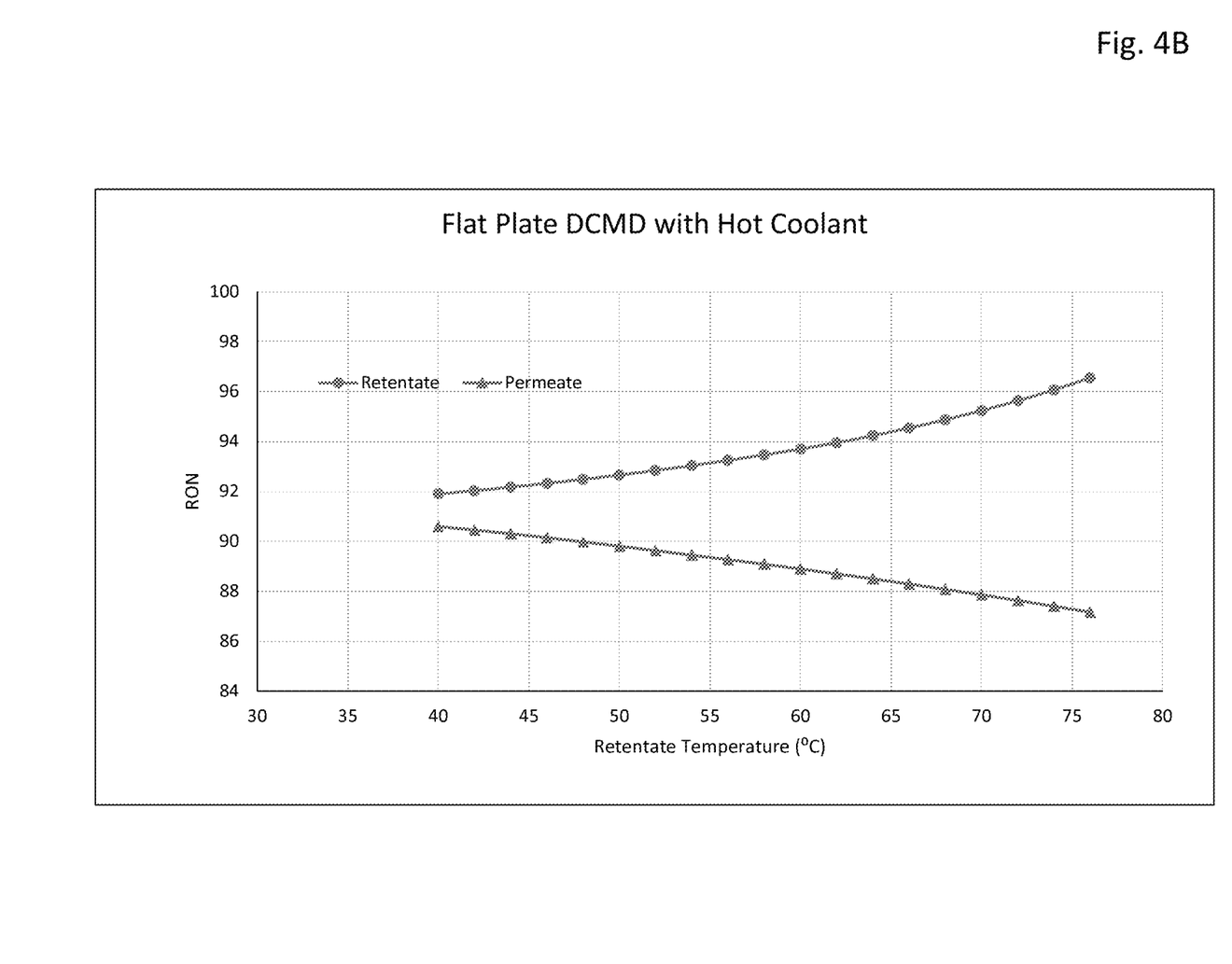
FIG. 4B displays a graph showing how Research Octane Number (RON) changes with retentate temperature in the separation system utilizing direct contact membrane distillation (DCMD) in accordance with one or more embodiments.

Similarly, FIG. 4A-4B shows how volumetric fraction and octane rating changes with retentate temperature respectively in a direct contact membrane distillation (DCMD) configuration in accordance with one or more embodiments of the present application. In these examples, the permeate channel consists of 91 gasoline surrogate fuel at ambient temperature. Like the sweeping gas configuration, FIG. 4A shows that, as the retentate temperature increases in the direct contact configuration, the volumetric fraction of permeate increases since more components are able to change into gas phase and penetrate the membrane. Also, as the retentate temperature increases, octane rating separation increases since the retentate channel becomes more concentrated in the high octane components (FIG. 4B).

It should be understood that although much of the foregoing description has been directed to systems and methods for on-board separation of fuel, the system and methods disclosed herein can be similarly deployed and/or implemented in scenarios, situations, and settings far beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A system for on-board fuel separation using membrane distillation, the system being mounted in a vehicle, comprising:
   a source fuel tank comprising liquid fuel;
   a pump configured to deliver the liquid fuel from the source fuel tank;
   a membrane module comprising a hydrophilic membrane, a retentate channel, and a permeate channel, the retentate and permeate channels being disposed on opposing sides of the hydrophilic membrane, wherein the retentate channel and the permeate channel are configured to receive the liquid fuel from the source fuel tank via a feed channel, and wherein the membrane module is configured to separate the liquid fuel via membrane distillation in which temperature and partial pressure differences between the retentate and permeate channels create a chemical potential difference between the retentate channel and permeate channel such that a high octane fraction remains in the retentate channel and a low octane fraction diffuses through the hydrophilic membrane to the permeate channel;
   a low octane fuel tank configured to receive the low octane fraction from the permeate channel; and
   a high octane fuel tank configured to receive the high octane fraction from the retentate channel, wherein an engine is fluidly connected to the permeate channel and the retentate channel, and configured to selectively receive at least a portion of the low octane fraction and at least a portion of the high octane fraction.

2. The system of claim 1, further comprising:
   a preheater configured to preheat the liquid fuel prior to delivery of the liquid fuel to the retentate and permeate channels of the membrane module.

3. The system of claim 1, wherein the hydrophilic membrane is in the form of a flat sheet, a hollow fiber, or a spiral wound.

4. The system of claim 1, further comprising:
   a heat exchanger fluidly connected to the retentate channel and configured to maintain a temperature of the retentate channel to enhance separation of the high octane fraction from the low octane fraction in the membrane module.

5. The system of claim 1, wherein the liquid fuel is gasoline, naphtha, or diesel fuel.

6. A system for on-board fuel separation using membrane distillation, the system being mounted in a vehicle and comprising:
   a source fuel tank comprising liquid fuel;
   a pump configured to deliver the liquid fuel from the source fuel tank;
   a membrane module comprising a hydrophilic membrane, a retentate channel, and a permeate channel, the retentate and permeate channels being disposed on opposing sides of the hydrophilic membrane, wherein the retentate channel is configured to receive the liquid fuel from the source fuel tank via a feed channel, wherein the feed channel is further configured to receive a solvent for enhancing the separation of a low octane fraction and a high octane fraction, and wherein the membrane module is configured to separate the liquid fuel via membrane distillation in which temperature and partial pressure differences between the retentate and permeate channels create a chemical potential difference between the retentate channel and permeate channel such that the high octane fraction remains in the retentate channel and the low octane fraction diffuses through the hydrophilic membrane to the permeate channel;
a gas channel fluidly connected to the permeate channel and configured to deliver a sweeping gas to the permeate channel;
a first flash tank fluidly connected to the permeate channel and configured to selectively receive at least a portion of the low octane fraction and the sweeping gas, and to separate the low octane fraction from the sweeping gas;
a low octane fuel tank configured to receive the separated low octane fraction from the first flash tank;
a second flash tank configured to receive the high octane fraction and the solvent from the retentate channel and separate the high octane fraction from the solvent; and
a high octane fuel tank configured to receive the high octane fraction from the second flash tank, wherein an engine is fluidly connected to the permeate channel and configured to selectively receive at least a portion of the low octane fraction and at least a portion of the high octane fraction.

7. The system of claim 6, further comprising:
a preheater configured to preheat the liquid fuel prior to delivery of the liquid fuel to the retentate channel of the membrane module.

8. The system of claim 6, further comprising:
a condenser fluidly connected to the permeate channel and the feed channel, and configured to condense the low octane fraction prior to delivery of the low octane fraction to the engine or the low octane fuel tank.

9. The system of claim 6, wherein the hydrophilic membrane is in the form of a flat sheet, a hollow fiber, or a spiral wound.

10. The system of claim 6, further comprising:
a heat exchanger fluidly connected to the retentate channel and configured to maintain the temperature of the retentate channel to enhance separation of the high octane fraction from the low octane fraction in the membrane module.

11. The system of claim 6, wherein the liquid fuel is gasoline, naphtha, or diesel fuel.

12. A method for on-board fuel separation in a vehicle using membrane distillation, the method comprising:
pumping liquid fuel from a source fuel tank to a membrane module, wherein the membrane module comprises a hydrophilic membrane, a retentate channel, and a permeate channel, the retentate and permeate channels being disposed on opposing sides of the hydrophilic membrane;
supplying a solvent to the liquid fuel upstream of the membrane module before pumping the liquid fuel into the membrane module;
separating, via the membrane module, the liquid fuel into a high octane fraction and a low octane fraction via membrane distillation in which temperature and partial pressure differences between the retentate and permeate channels create a chemical potential difference between the retentate channel and permeate channel, wherein the high octane fraction collects in the retentate channel and the low octane fraction diffuses through the hydrophilic membrane to the permeate channel, and wherein the solvent enhances the separation of the low octane and high octane fractions in the membrane module;
separating the high octane fraction from the solvent via flash distillation in a flash tank;
selectively delivering at least a portion of the high octane fraction from the flash tank to a high octane fuel tank or to an engine of the vehicle; and
selectively delivering at least a portion of the low octane fraction from the permeate channel to a low octane fuel tank or to the engine of the vehicle.

13. The method of claim 12, further comprising:
preheating the liquid fuel prior to its delivery to the membrane module.

14. The method of claim 12, further comprising:
heating the retentate channel via a heat exchanger to enhance separation of the high octane fraction from the low octane fraction.

15. The method of claim 14, wherein the heat exchanger produces heat using a hot coolant or an exhaust gas.

16. The method of claim 12, further comprising:
passing a sweeping gas stream through the permeate channel to produce a mixture of sweeping gas and the low octane fraction;
condensing the low octane fraction in a condenser prior to delivery of the low octane fraction to the engine or the low octane fuel tank; and
separating the low octane fraction from the sweeping gas via another flash tank prior to delivery of the low octane fraction to the low octane fuel tank.

17. The method of claim 12, wherein the hydrophilic membrane is in the form of a flat sheet, a hollow fiber, or a spiral wound.

18. The method of claim 12, wherein the liquid fuel is gasoline, naphtha, or diesel fuel.

* * * * *